(12) United States Patent
Masuda et al.

(10) Patent No.: US 6,530,595 B2
(45) Date of Patent: Mar. 11, 2003

(54) PROTECTIVE CUSHION FOR VEHICLE OCCUPANT'S HEAD

(75) Inventors: Yasushi Masuda, Tokyo (JP); Atsuyuki Uchiyama, Tokyo (JP); Joji Mishina, Tokyo (JP); Ryosuki Nakanishi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/760,724

(22) Filed: Jan. 17, 2001

(65) Prior Publication Data

US 2001/0019201 A1 Sep. 6, 2001

Related U.S. Application Data

(63) Continuation-in-part of application No. 09/377,714, filed on Aug. 20, 1999, now Pat. No. 6,199,898.

(30) Foreign Application Priority Data

Aug. 20, 1998 (JP) ......................................... H10-234417

(51) Int. Cl.⁷ ............................................... B60R 21/22
(52) U.S. Cl. ................. 280/730.2; 280/729; 280/743.1; 280/749
(58) Field of Search .............................. 280/730.2, 729, 280/743.1, 749; 138/177, 118, 118.1, 129, 172

(56) References Cited

U.S. PATENT DOCUMENTS

| | | | |
|---|---|---|---|
| 836,905 A | * 11/1906 | Whitehouse | |
| 3,970,328 A | 7/1976 | Wallsten | 280/731 |
| 5,316,336 A | 5/1994 | Taguchi et al. | 280/730.2 |
| 5,788,270 A | 8/1998 | Haland et al. | 280/730.2 |
| 5,899,486 A | 5/1999 | Ibe | 280/730.2 |
| 6,129,377 A | * 10/2000 | Okumura et al. | 280/730.2 |
| 6,199,898 B1 | * 3/2001 | Masuda et al. | 280/730.2 |
| 6,375,214 B1 | * 4/2002 | Nishikaji | 280/730.2 |
| 6,378,895 B1 | * 4/2002 | Brucker et al. | 280/730.2 |
| 6,409,211 B1 | * 6/2002 | Sheng et al. | 280/730.2 |
| 6,412,810 B1 | * 7/2002 | Wipasuramonton et al. | 280/730.2 |

FOREIGN PATENT DOCUMENTS

| | | | | |
|---|---|---|---|---|
| JP | 5-105024 | * | 4/1993 | 280/729 |
| WO | 96/26087 | | 8/1996 | |

* cited by examiner

*Primary Examiner*—Eric Culbreth
(74) *Attorney, Agent, or Firm*—Foley & Lardner (57) ABSTRACT

A protective cushion or airbag for a vehicle occupant's head which can introduce gas into chambers simultaneously or with desired time lags among the chambers. A cushion comprises an occupant-side sheet and an body-side sheet which are superposed on each other and sewn together so as to form vacant chambers between the sheets. A cylindrical member is disposed between upper portions of the sheets. Gas supplied through a rear end of the cylindrical member is introduced into the chambers openings and a front end of the cylindrical member.

19 Claims, 8 Drawing Sheets

PROTECTIVE CUSHION FOR VEHICLE OCCUPANT'S HEAD

This is a continuation-in-part of copending application serial number 09/377,714 filed on Aug. 20, 1999 now U.S. Pat. No. 6,199,898 B1.

BACKGROUND OF THE INVENTION

1. Field of the Invention

The present invention relates to a protective cushion for a vehicle occupant's head and, more particularly, to a cushion which can be inflated along windows of side doors in the event of a side impact or roll-over situation.

2. Description of Related Art

One such protective cushion for a vehicle occupant's head is disclosed in International Patent Publication WO96/26087, particularly, FIG. 1 and FIG. 9 of the publication. The known cushion has a vacancy comprising a duct extending from the end at the front side of a vehicle (the front end) to the end at the rear side of the vehicle (the rear end) along the upper edge of the cushion. There are also a plurality of cells or chambers that extend downward from and communicate with the duct. Between the adjacent cells, an occupant-side sheet (hereinafter, sometimes referred to as "cabin-side sheet") and a vehicle body-side sheet (hereinafter, sometimes referred to as "door-side sheet") are joined.

According to the cushion disclosed in WO96/26087, the duct is formed by interweaving the cabin-side sheet and the door-side sheet. The duct thus formed is not ideal for introducing gas into the cells.

SUMMARY OF THE INVENTION

Accordingly, it is a general object of the invention to provide a protective cushion for a vehicle occupant's head that alleviates or minimizes the above described difficulties.

It is an object of the present invention to provide a protective cushion for a vehicle occupant's head that allows gas to be introduced into chambers, which are formed between sheets, in a timely manner.

It is yet another object of the present invention to provide a protective cushion for a vehicle occupant's head that is simple and cost-effective to manufacture.

A preferred embodiment of the invention intended to accomplish at least some of the foregoing objects includes a protective cushion for a vehicle occupant's head disposed in the vicinity of a corner between a ceiling and a side surface of a vehicle cabin and is adapted to be inflated with introduced gas downwardly along the side surface. The protective cushion includes an occupant-side sheet and a body-side sheet superposed on each other and sewn together so as to form a plurality of vacant chambers. Gas is introduced into the plurality of chambers which are positioned between the sheets and arranged in the longitudinal direction of a vehicle.

The cushion also has a longitudinally extended gas passage at its upper portion. The gas passage is constructed of a cylindrical member that is provided separate from the body-side and occupant-side sheets. There is at least one opening at an approximate midpoint of the gas passage that allows gas to be transferred from the cylindrical member to the plurality of chambers of the cushion.

In the protective cushion for a vehicle occupant's head, gas supplied to the cylindrical member is supplied into plurality of chambers through an end of the cylindrical member and/or openings formed in the cylindrical member. By selecting the length of the cylindrical member and/or the positions of the openings, gas can be introduced into desired chambers from desired positions.

The cylindrical member may be made of a fabric sheet rolled to form a cylindrical member wall thickness which is at least as thick as twice the thickness of the cylindrical member sheet itself. When the cylindrical member sheet is rolled to form a wall with at least two layers, the layers may be affixed to one another by using an adhesive between the layers located in the vicinity of the openings formed in the cylindrical member. In the cases in which the cylindrical member is made from a sheet, the cylindrical member sheet, the cabin-side sheet, and the door-side sheet may be sewn together with a common thread or yarn. The sewing preferably is both for forming the cylindrical member and for sewing together the cabin-side sheet and the door-side sheet, thus reducing the man-hours required in manufacturing the cushion.

The cylindrical member sheet may have a pair of longer ends and a pair of shorter ends. In these instances, the longer ends are positioned between an end of the occupant-side sheet and an end of the body-side sheet.

The cushion may have a plurality of projections commonly extending from the cylindrical member, the occupant-side sheet, and the body-side sheet. The projections may have a plurality of holes through which bolts or rivets may be inserted to secure the cushion to the vehicle body. In this case, the force applied to the cylindrical member is transmitted directly to the vehicle body. In addition, if the cylindrical member is a sheet and if the cylindrical member sheet, the occupant-side sheet, and the body-side sheet are sewn together with a common thread or yard, the common thread or yarn may be positioned between the cylindrical member and the plurality of projections.

According to the present invention, the protective cushion may further comprise a closing element, including stitches or an adhesive, in the cylindrical member downstream portion from the opening in the gas flowing direction. This stitching closes or constricts the sectional area of the gas passage in the cylindrical member. Preferably, when the gas pressure in the cylindrical member reaches or exceeds a predetermined value, the sectional area of the gas passage is enlarged as a result of the stitching breaking. In this fashion, the closing element may serve to constrict the passage of the cylindrical member at least until termination of the inflation of the cushion.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

FIGS. 2(a) through 2(i) are sectional views taken along lines IIa—IIa through IIi—IIi of FIG. 1, respectively. FIGS. 2(j) through 2(m) are sectional views showing the cushion of FIGS. 2(c), 2(d), 2(e), and 2(h), respectively, in the inflated state.

DETAILED DESCRIPTION OF THE PREFERRED EMBODIMENTS

Referring now to the drawings and initially to FIGS. 1–5, there will be seen a protective cushion or airbag 1 for a vehicle occupant's head according to a first embodiment of the invention.

Figure 1:
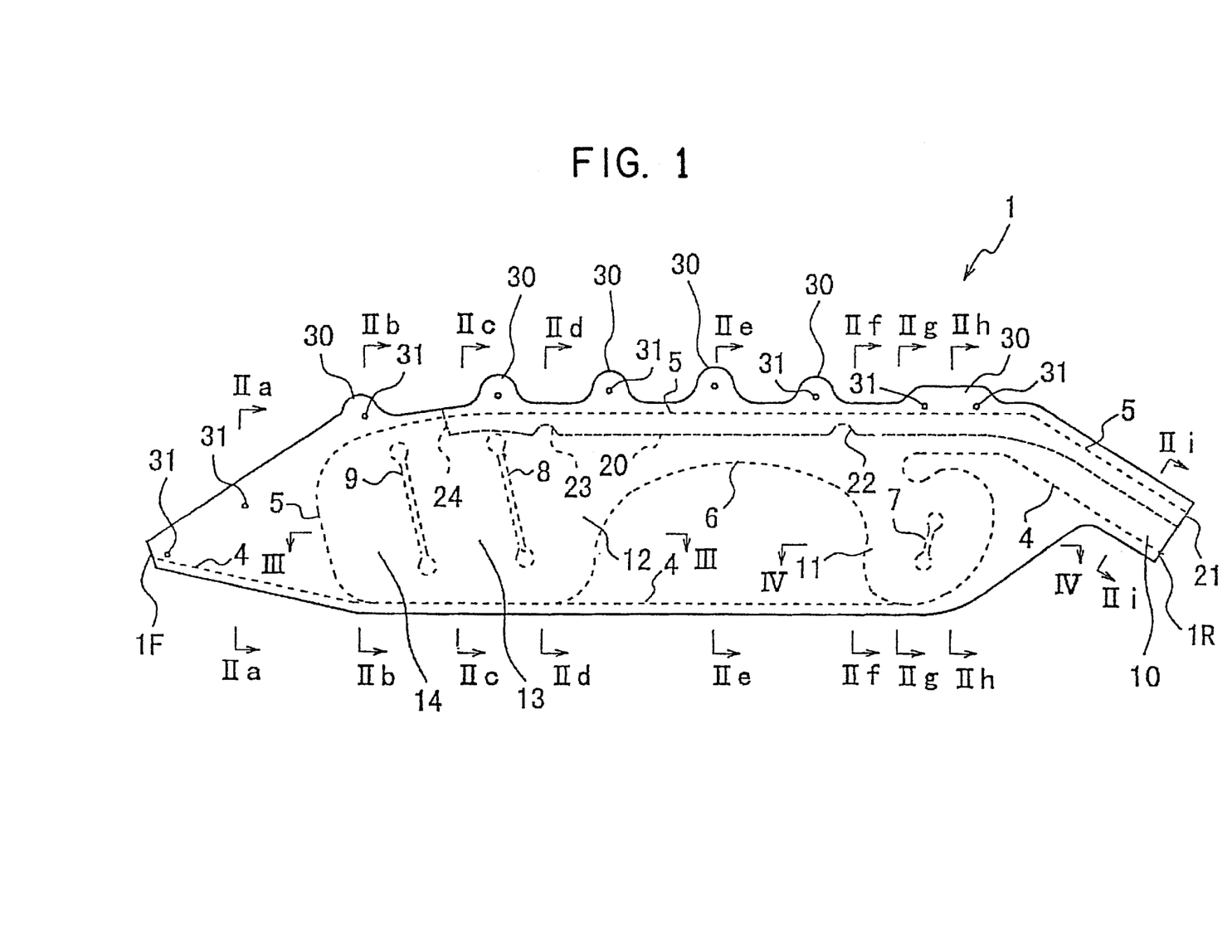
FIG. 1 is a front view of a protective cushion 1 according to a first embodiment of the invention.
Figures 2A, 2B:
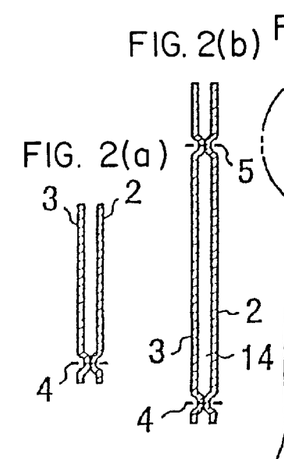
Figures 2C, 2D:
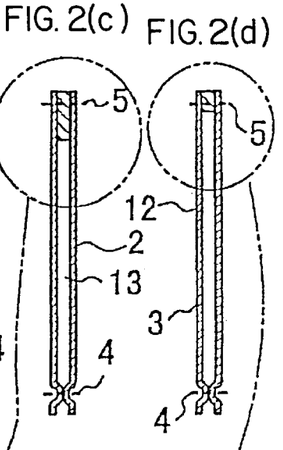
Figures 2E, 2F, 2J:
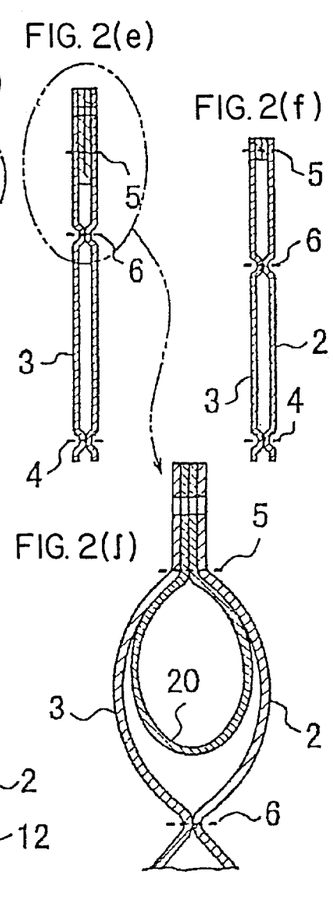
Figure 2G:
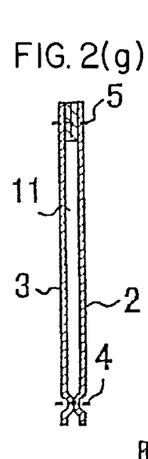
Figures 2H, 2I:
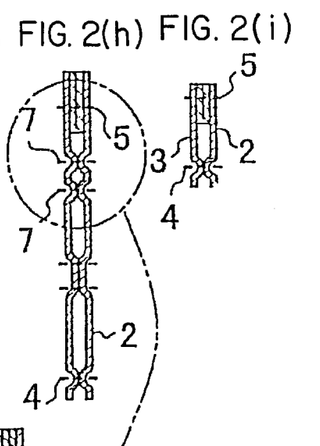
Figures 2J, 2K:
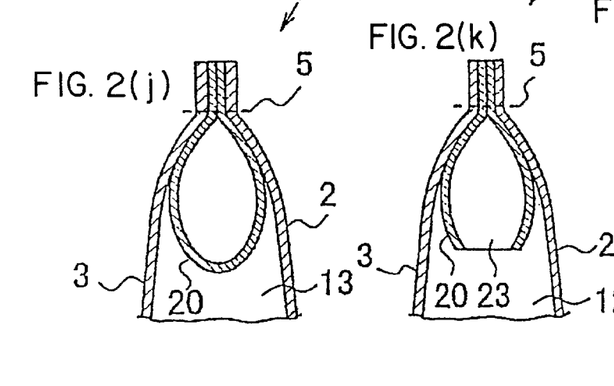
Figure 2M:
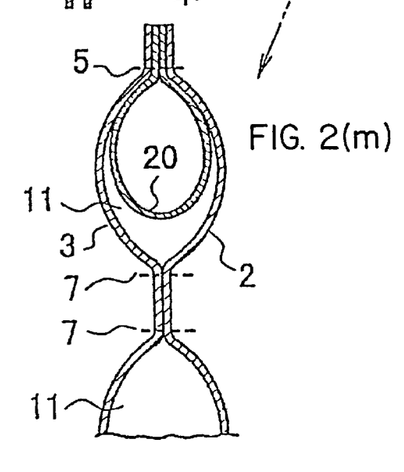
Figure 3:
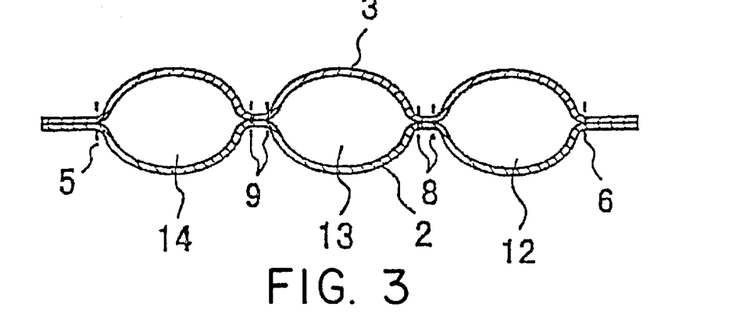
FIG. 3 is a sectional view showing the inflated cushion 1 taken along a line III—III of FIG. 1.
Figure 4:
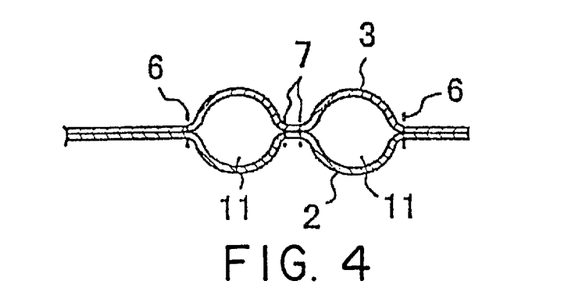
FIG. 4 is a sectional view showing the inflated cushion 1 taken along a line IV—IV of FIG. 1.

This cushion 1 includes an occupant-side sheet or cabin-side sheet 2 and a body-side sheet or door-side sheet 3 superposed on each other and sewn together with thread (numerals 4 through 9 designate stitches) so as to define vacant chambers (hereinafter, referred to as only "chambers") 10 through 14 between the sheets 2 and 3.

The stitch 4 extends along the lower edges of the sheets 2, 3 from the front end 1F to the rear end 1R of the cushion 1. The stitch 4 is curved into a U-like shape away from the lower edges of the sheets 2, 3 in the vicinity of the rear end 1R, thus forming an elongated chamber 10 between the stitches 5 and 4.

The stitch 5 extends along the upper edges of the sheets 2, 3 and extends downwardly from the vicinity of the front end 1F apart from the upper edge so as to meet with the stitch 4.

The stitch 6 sews sheets 2, 3 together in the vicinity of a longitudinal middle portion of the cushion 1. The main part of the stitch 6 extends in the longitudinal direction in the vertical middle of the cushion 1 and both end portions of the stitch 6 extend in the vertical direction to meet with the stitch 4. The stitch 6 substantially separates the chambers 11, 12 from each other, as shown in FIG. 1. The chambers 11, 12 communicate with each other at their upper portions.

The stitch 7 sews the sheets 2, 3 together at approximately the center of the chamber 11 to prevent the thickness of the chamber 11 (the maximum distance between the sheets 2, 3) from exceeding a predetermined range.

The stitches 8, 9 extend in the vertical direction to separate chambers 12, 13, 14 from each other. The chambers 12, 13, 14 communicate with each other at their upper portions and their lower portions.

Figure 5:
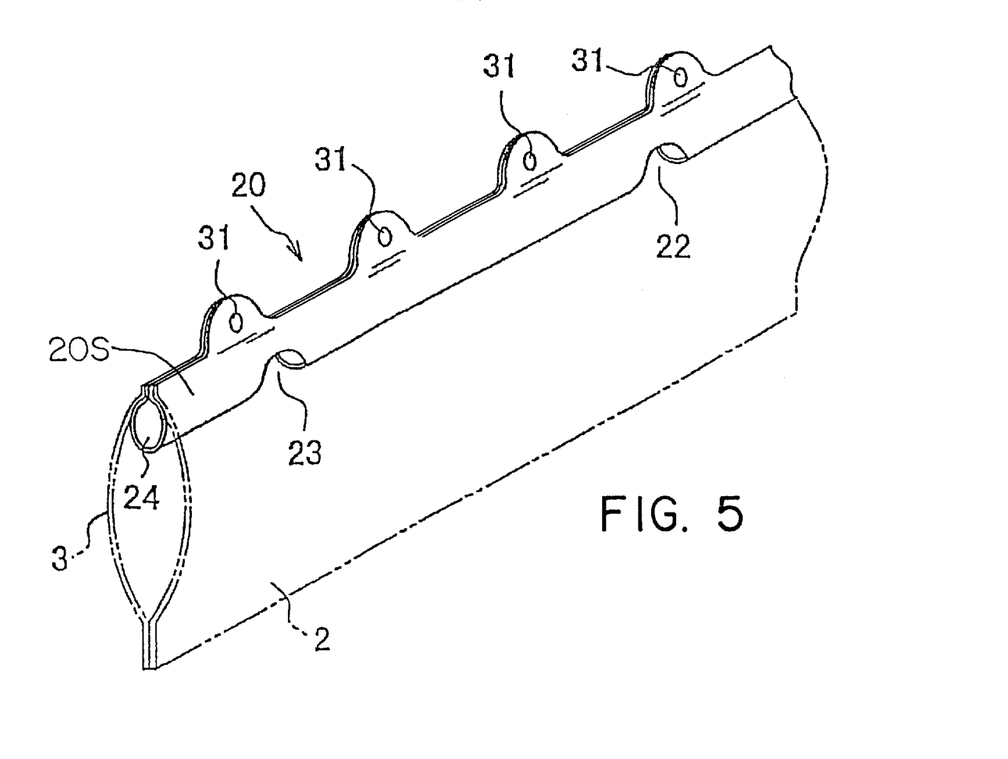
FIG. 5 is a perspective view of a cylindrical member 20.

A cylindrical member 20 is disposed between upper portions of the sheets 2, 3. The cylindrical member 20 includes a long band-like sheet 20S folded longitudinally and arranged between the upper portions of the sheets 2, 3 such that the folded portion is positioned at a lower side of the cushion 1. The sheet 20S is sewn together with the sheets 2, 3 by stitching 5 so as to form the cylindrical member 20.

The cylindrical member 20 has a rear end 21 at approximately the same position as the rear end 1R of the cushion 1 and an open front end 24 at a position above the chamber 13. An opening 22, which faces chamber 11, and an opening 23, which faces chamber 12, are formed in the cylindrical member 20 approximately midway between the stitched ends of the sheet 20S. An inflator is connected to the rear end 21 of the cylindrical member 20.

In this embodiment, the openings formed in the cylindrical member are designed so that the nearer the openings are to the inflator, the smaller the openings are, thereby achieving an equal gas supply to chambers 11 through 14.

The sheets 2, 3 and the sheet 20S of the cylindrical member 20 are each provided with a plurality of projections 30 projecting upward from the cushion 1. These projections 30 have small holes 31 formed therein. The cushion 1 is fixed to the vehicle body by inserting bolts or rivets through these small holes 31. The impact that occurs when the cylindrical member 20 is inflated is transmitted to the vehicle body through the bolts or rivets, not via the sheets 2, 3. The required strength of the sheets 2, 3 is therefore reduced.

For example, the cushion 1 is arranged such that the rear end 1R is disposed on a C pillar of the vehicle and the front end 1F is disposed on an A pillar of the vehicle. The cushion 1 is folded and arranged along a roof side rail. As described above, the inflator is connected to the rear end 21 of the cylindrical member 20.

The folded cushion 1 is covered by a cover. The cover is structured to be torn or opened into the cabin when the cushion 1 is inflated. The cover may be exclusive for the protective cushion or may be an interior garnish of the vehicle.

When the vehicle is involved in a lateral collision or roll-over, the inflator is actuated so that gas flows into the cylindrical member 20 through the rear end 21. The gas flows inside the cylindrical member 20 and partially enters into the chambers 11, 12 through the openings 22, 23 so as to inflate the chambers 11, 12. The gas partially enters into the chambers 13, 14 through the front end 24 of the cylindrical member 20 so as to inflate the chambers 13, 14. The inflated chamber 11 expands on the side of the head of an occupant sitting on a rear seat and the inflated chambers 12, 13, 14 expand on the side of the head of an occupant sitting on a front seat.

In the cushion 1, the cylindrical member 20 is provided so that gas flows out through the openings 22, 23, and the front end 24 of the cylindrical member 20 into the chambers 11 through 14 according to a predetermined route. Thus, the chambers 11 through 14 are inflated substantially at the same time.

Figure 6:
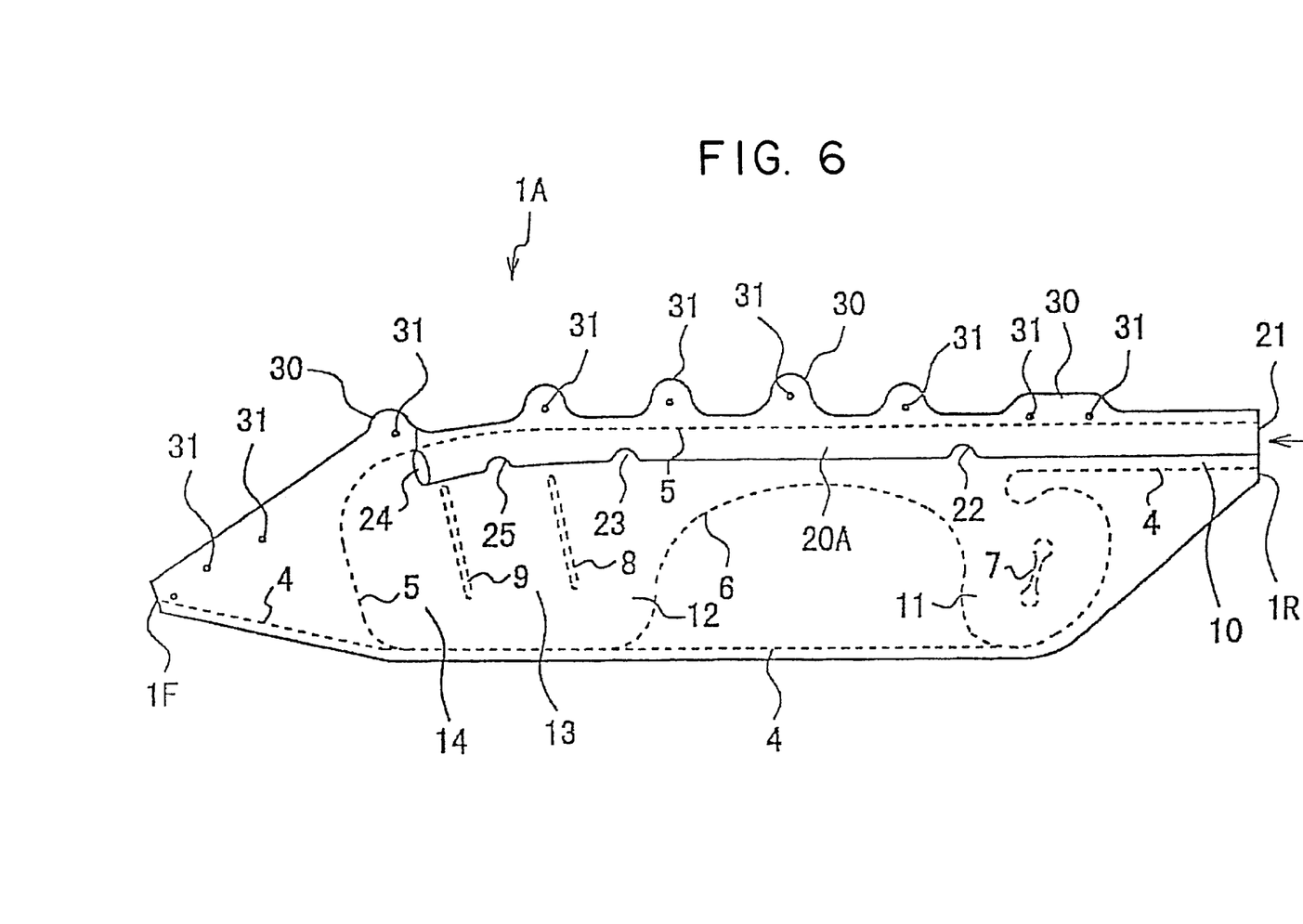
FIG. 6 is a front view of a cushion 1A according to a second embodiment of the invention.
Figure 7A:
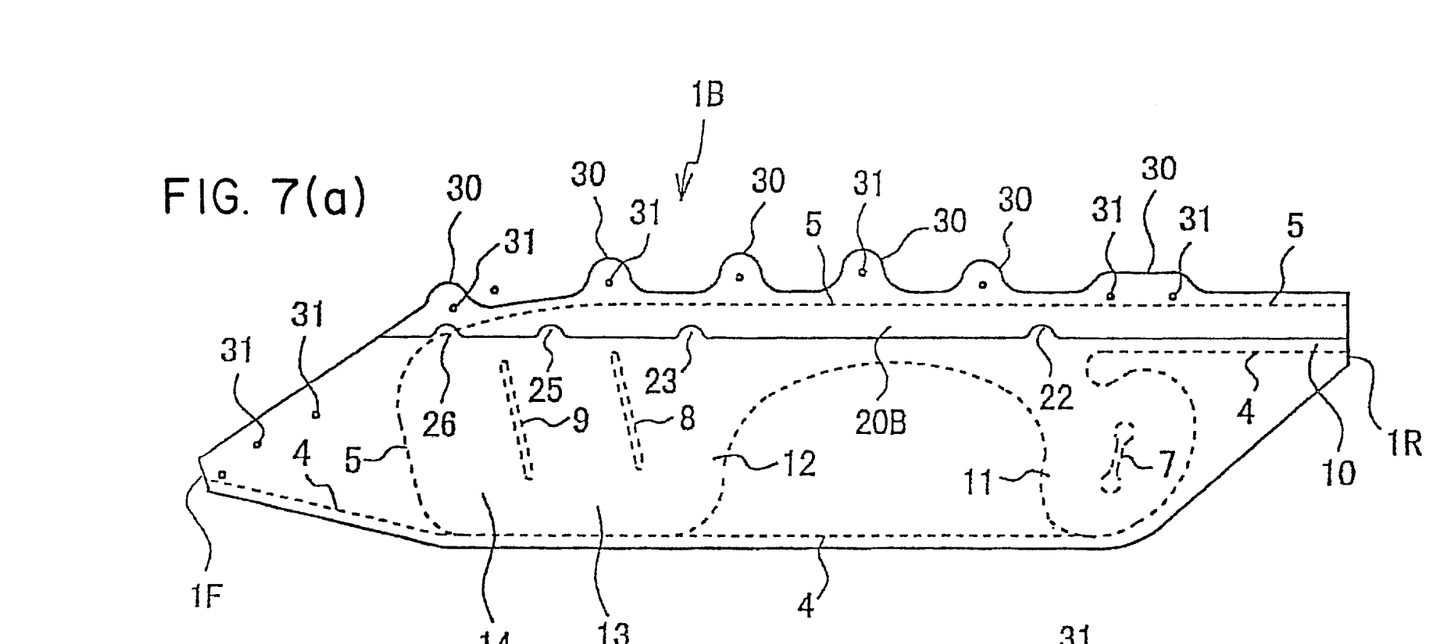
FIG. 7(a) is a front view of a cushion 1B according to a third embodiment of the invention and FIG. 7(b) is a partial enlarged view of FIG. 7(a).
Figure 7B:
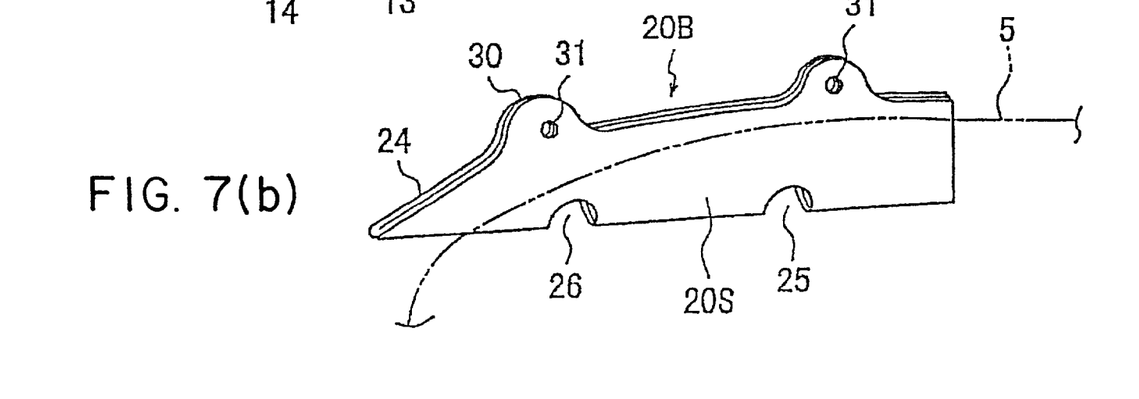

FIGS. 6, 7(a), 7(b) are front views of cushions 1A, 1B according to second and third embodiments, respectively. In FIGS. 6, 7(a), 7(b), cylindrical members 20A, 20B are shown in the through-vision state. Each rear portion of the cushions 1A, 1B has a horizontal upper side and an oblique lower side.

In FIG. 6, a front end 24 of the cylindrical member 20A is positioned in the chamber 14. The cylindrical member 20A is provided with an opening 25 facing the chamber 13. In FIG. 7, a front end 24 of the cylindrical member 20B is positioned at edges of the sheets 2, 3. The cylindrical member 20B is provided with openings 25, 26 facing the chambers 13, 14, respectively. The remaining structure of the cushions shown in FIGS. 6, 7(a), 7(b) are the same as those of the cushion shown in FIGS. 1 through 5.

In the cushion 1A, gas from the inflator flows out through the openings 22, 23, 25 and the front end 24 of the cylindrical member so as to inflate the chambers 10 through 14. In the cushion 1B, gas from the inflator flows out through the openings 22, 23, 25, 26 so as to inflate the chambers 10 through 14. In both of the cushions 1A, 1B, gas is supplied to the chambers 11 through 14 according to a predetermined route. Also in both of the cushions 1A, 1B, the chambers 11 through 14 are inflated at substantially the same time.

Figures 8A, 8B:
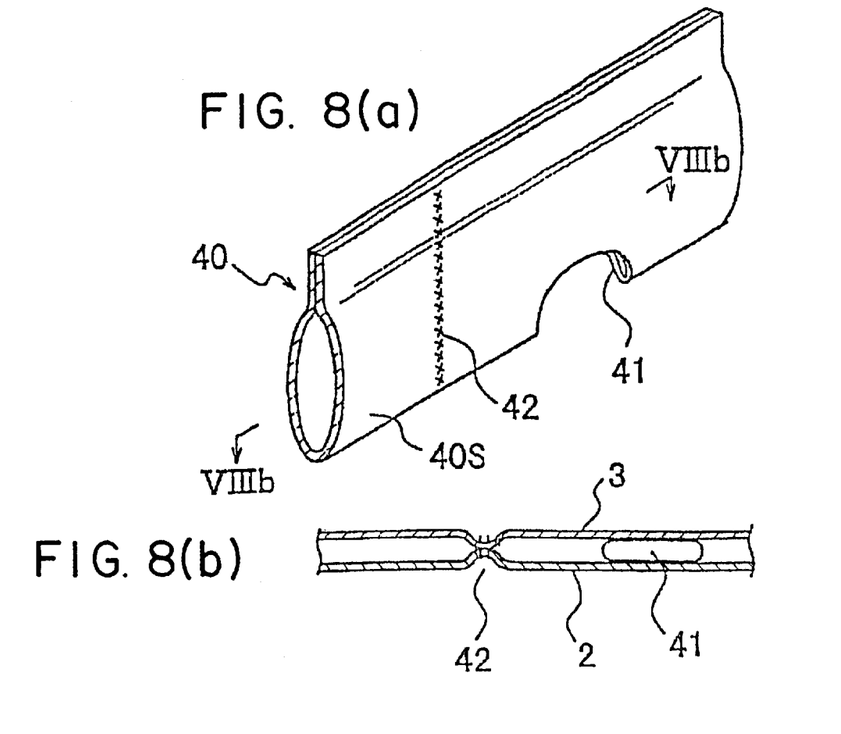
FIG. 8(a) is a perspective view of a cylindrical member 40 and FIG. 8(b) is a sectional view taken along a line VIIIb—VIIIb of FIG. 8(a).
Figure 9:
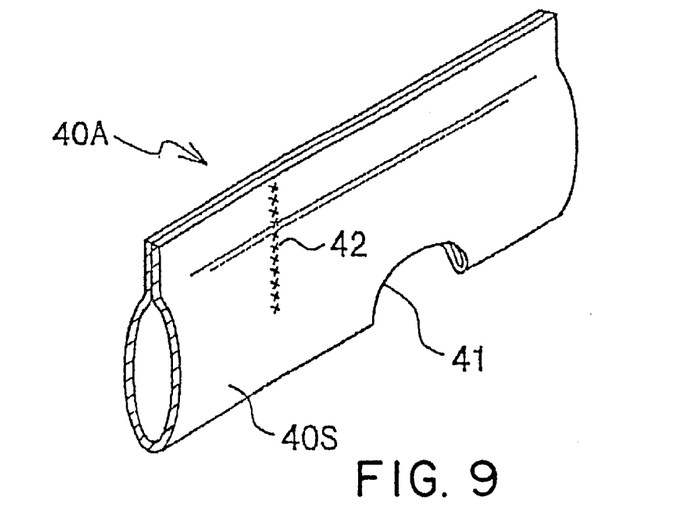
FIG. 9 is a perspective view of a cylindrical member 40A.

FIGS. 8(*a*), 8(*b*), and 9 show cylindrical members 40, 40A that allow the inflation of the chambers 10 through 14 with some time lags. Each cylindrical member 40, 40A comprises a sheet 40S which is folded longitudinally into two half-sheets. An upper portion of the folded sheet 40S is sewn together with the sheets 2, 3 by the stitch 5 so as to form the cylindrical member 40, 40A. Each cylindrical member 40, 40A has an opening 41, through which gas flows out, at an approximate longitudinal middle of the cylindrical member. Each cylindrical member 40, 40A is provided with stitches 42, i.e., a constricting or closing element, which can be broken, located downstream from the opening 41. In FIG. 8(*a*), the stitches 42 extend from the upper edge to the lower edge of the cylindrical member 40, entirely closing the passage inside the cylindrical member 40. On the other hand, in the cylindrical member 40A, the stitches 42 close only an upper half of the passage inside the cylindrical member 40A.

As gas is introduced into the cylindrical member 40, 40A, the gas flows out through the opening 41. When the gas pressure at the upstream side of the stitches 42 exceeds a predetermined value, and the subsequent load on the stitches 42 causes the tension on the stitches 42 to be larger than the tensile strength of the yarn or thread of the stitches 42, the yarn or thread of the stitches 42 is broken so that a large amount of gas flows downstream from the stitches 42.

As mentioned above, the stitches 42 can achieve the staggered inflation among the chambers. The stitches 42 can be structured so that a larger amount of gas is introduced into a larger chamber while a smaller amount of gas is introduced into a smaller chamber.

The stitches 42 closing a part of the passage inside the cylindrical member as shown in FIG. 9 may not be broken. In this case, the stitches 42 function as a constriction in the passage of the cylindrical member until the termination of inflation of the cushion.

Figure 10A:
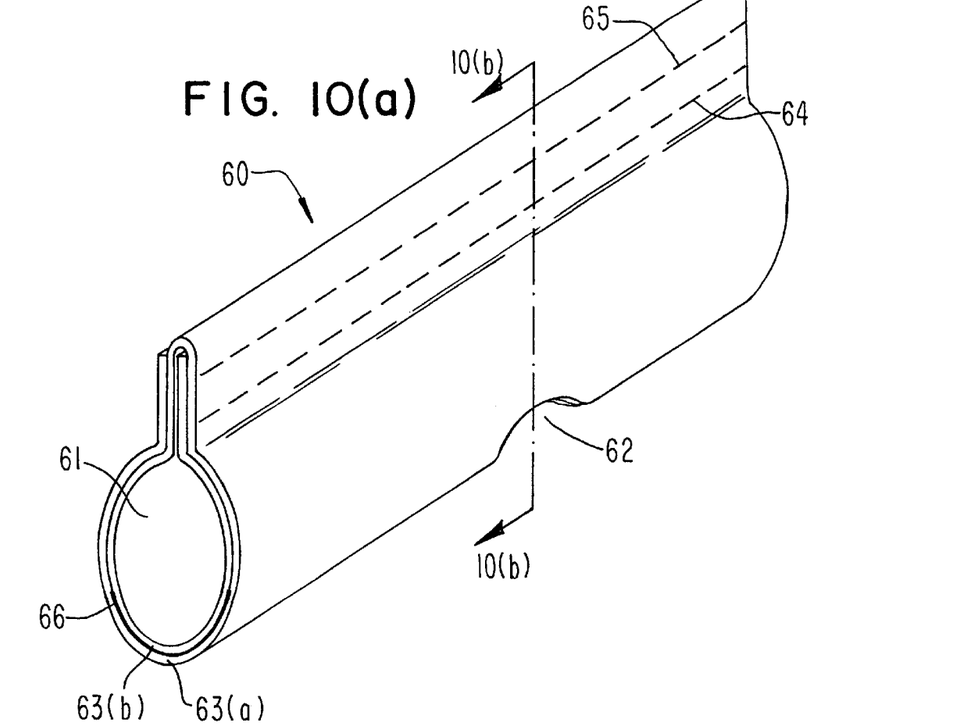
FIG. 10(a) is a perspective view of a cylindrical member and FIG. 10(b) is a cross-sectional view of the cylindrical member of FIG. 10(a) taken along line 10(b)—10(b).
Figure 10B:
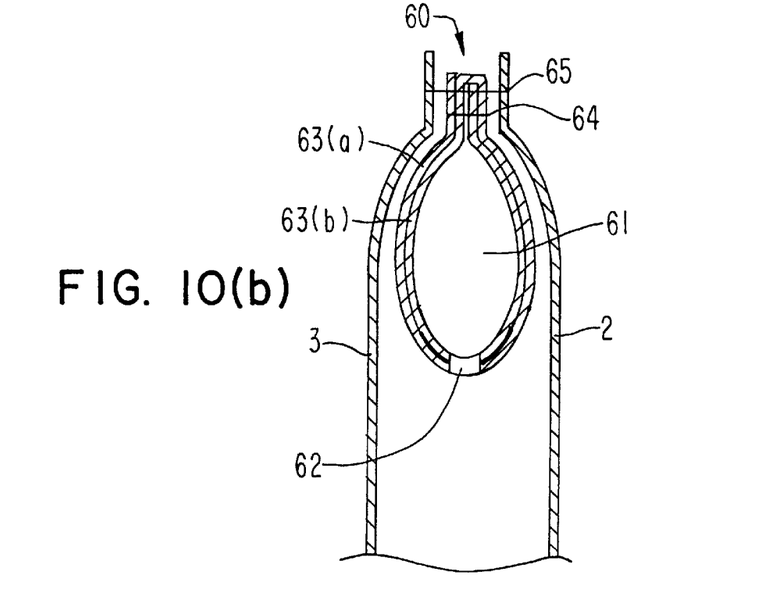

FIGS. 10*a* and 10*b* depict an alternative embodiment of cylindrical member 60. A chamber 61 is formed in the cylindrical member 60, by a single fabric sheet which is rolled to create a wall with a thickness equal to twice the thickness of the sheet. By doubling the thickness of the cylindrical member 60, the strength of the cylindrical member is increased. Increasing the strength of the cylindrical member 60 correspondingly reduces potential damage to the cabin side sheet 2 and the door side sheet 3 of the cushion 1.

Cylindrical member 60 allows chambers 11 through 14 to be filled with gas. The chambers are filled as gas exits the cylindrical member 60 through opening 62. The cylindrical member 60 may include multiple openings such as shown in FIG. 1, for example. Lower portions of the outer most layer 63(*a*) and the inner most layer 63(*b*) of the cylindrical member 60 may be attached to each other by an adhesive 66 located near the opening 62. The use of adhesive increases the strength of the cylindrical member in the vicinity of the opening 62. The upper portion of the layers 63(*a*), 63(*b*) are sewn together by thread or yarn in the form of upper and lower stitches 64, 65. As shown in FIG. 10(*b*) the lower stitch 64 is structured to sew together only the layers 63(*a*), 63(*b*) of the cylindrical member 60. The upper stitch 65 sews the cylindrical member 60, and the cabin-side sheet 2 and the door-side side sheet 3 together. The lower stitch 64 is designed to break when the gas pressure inside the chamber 61 reaches a certain value. When the lower stitch 64 is broken, the upper stitch 65 has sufficient strength to maintain the integrity of the chamber 61 thereby ensuring that chambers 11 through 14 are properly inflated. In addition, when the lower stitch 64 breaks, it absorbs some of the energy or load of the expanding gas, thus, reducing the load on the upper stitch 65.

Figure 11A:
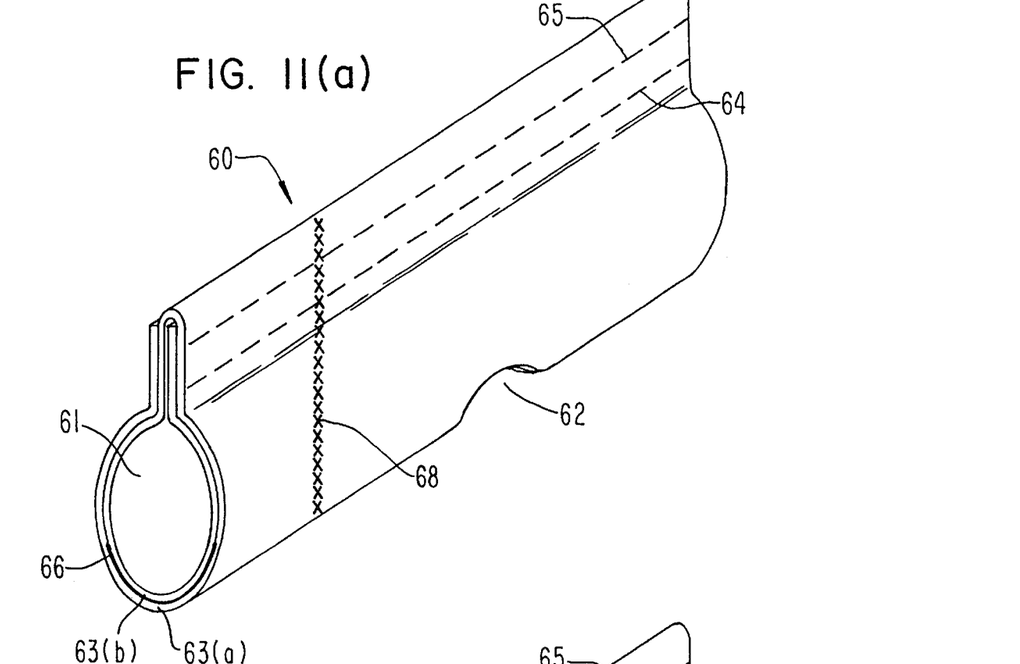
FIG. 11(a) is a perspective view of an alternative embodiment of the cylindrical member, shown in FIGS. 10(a) and 10(b).
Figure 11B:
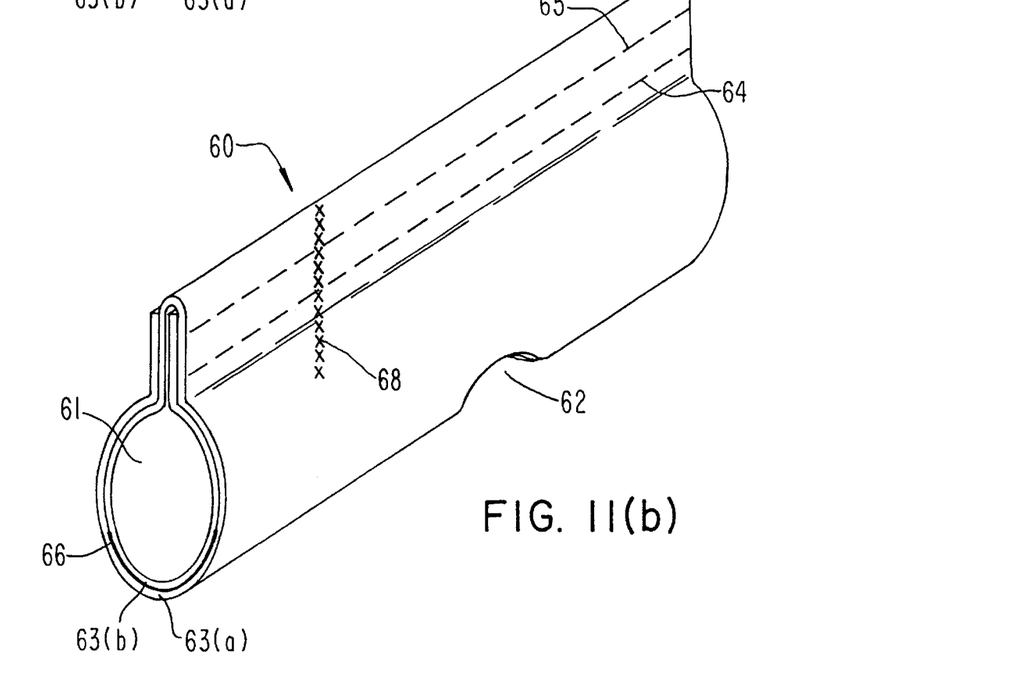
FIG. 11(b) is a perspective view of the cylindrical member 60, shown in FIGS. 10(a) and 10(b), with a stitching 42 from the embodiment shown in FIG. 9.

The cylindrical member 60 may include both vertical stitches 68 and horizontal stitches 64, 65 as shown in FIGS. 11(*a*) and 11(*b*). FIGS. 11(*a*) and 11(*b*) show a cylindrical member 60 that allows the inflation of the chambers 11 through 14 with some time lags. The cylindrical member 60 has an opening 62, through which gas flows out, at an approximate longitudinal middle of the cylindrical member. The cylindrical member 60 is provided with stitches 68, i.e., a constricting or closing element, which can be broken, located downstream from the opening 62. In FIG. 11(*a*), the stitches 68 extend from the upper edge to the lower edge of the cylindrical member 60, entirely closing the passage inside the cylindrical member 60. On the other hand, in the cylindrical member 60 shown in FIG. 11(*b*), the stitches 68 close only an upper half of the passage inside the cylindrical member 60.

As gas is introduced into the cylindrical member 60, the gas flows out through the opening 62. When the gas pressure at the upstream side of the stitches 68 exceeds a predetermined value, and the subsequent load on the stitches 68 causes the tension on the stitches 68 to be larger than the tensile strength of the yarn or thread, the yarn or thread of the stitches 68 is broken so that a large amount of gas flows downstream from the stitches 68.

As mentioned above, the stitches 68 can achieve the staggered inflation among the chambers. The stitches 68 can be structured so that a larger amount of gas is introduced into a larger chamber while a smaller amount of gas is introduced into a smaller chamber.

The stitches 68 closing a part of the passage inside the cylindrical member as shown in FIG. 11(*b*) may not be broken. In this case, the stitches 68 function as a constriction in the passage of the cylindrical member until the termination of inflation of the cushion.

Though the cylindrical member is made of a sheet in the above embodiments, the cylindrical member may be a pipe made of metal or a synthetic resin. When made of a synthetic resin, the pipe or tube could be flexible; it could be a rubber hose. The term cylindrical includes a member that is elliptical or substantially elliptical in cross section.

Though the preferred embodiment of the closing or constricting element is stitching 42, the closing or constricting element 42,68 may also be an adhesive.

Though the cushion has the length from the A pillar to the C pillar in the above embodiments, the cushion may extend from the A pillar to the B pillar, or, from the B pillar to the C pillar. The gas inlet of the cylindrical member may be positioned at the front end thereof or at a middle portion of the cylindrical member.

As described above, according to the present invention, gas can be supplied to chambers of a protective cushion for a vehicle occupant's head at the same time or with desired time lags among the chambers.

Additional advantages and modifications will readily appear to those skilled in the art. The invention in its broader aspects, therefore, is not limited to the specific details and representative devices described herein.

The priority document, Japanese Patent Application H10-234417 filed Aug. 20, 1998, is hereby incorporated by reference.

What is claimed is:

1. A protective cushion for a vehicle occupant's head, the vehicle having a longitudinal direction which extends generally from a rear of the vehicle toward a front of the vehicle, the protective cushion comprising:

an occupant-side sheet and a body-side sheet superposed on each other and sewn together so as to define a plurality of chambers, arranged in the longitudinal direction of the vehicle, into which a fluid is to be filled; and a cylindrical member having a wall formed by a cylindrical member sheet rolled into layers, wherein the thickness of the wall is at least twice the thickness of the cylindrical member sheet, wherein the cylindrical member is separate from and provided between the occupant-side sheet and the body-side sheet to define a longitudinal fluid passage at an upper portion of the cushion, and wherein the cylindrical member has at least one opening at an approximate middle of the cylindrical member to provide fluid communication between the fluid passage and the plurality of chambers.

2. A protective cushion for a vehicle occupant's head according to claim 1, wherein the cylindrical member, the occupant-side sheet, and the body-side sheet are sewn together with a common thread.

3. A protective cushion for a vehicle occupant's head according to claim 1, wherein the cylindrical member sheet has a pair of longer ends and a pair of shorter ends.

4. A protective cushion for a vehicle occupant's head according to claim 3, wherein the longer ends of the cylindrical member sheet are positioned between an end of the occupant-side sheet and an end of the body-side sheet.

5. A protective cushion for a vehicle occupant's head according to claim 1, wherein the cylindrical member, the occupant-side sheet, and the body-side sheet are superposed on each other at an upper portion of the protective cushion.

6. A protective cushion for a vehicle occupant's head according to claim 1, further comprising a plurality of projections commonly extending from the cylindrical member, the occupant-side sheet, and the body-side sheet.

7. A protective cushion for a vehicle occupant's head according to claim 6, further comprising a plurality of holes in the projections for fixing the protective cushion to the vehicle.

8. A protective cushion for a vehicle occupant's head according to claim 1, further comprising a closing element in the cylindrical member downstream from the at least one opening, wherein the closing element closes a sectional area of the cylindrical member.

9. A protective cushion for a vehicle occupant's head according to claim 8, wherein, when a gas pressure in the cylindrical member reaches a predetermined value, the closing element breaks.

10. A protective cushion for a vehicle occupant's head according to claim 8, wherein the closing element includes stitching.

11. A protective cushion for a vehicle occupant's head according to claim 8, wherein the closing element includes an adhesive.

12. A protective cushion for a vehicle occupant's head according to claim 1, further comprising adhesive positioned between the layers of the wall.

13. A protective cushion for a vehicle occupant's head according to claim 12, wherein the adhesive positioned between the layers is located in the vicinity of the at least one opening.

14. A protective cushion for a vehicle occupant's head according to claim 1, wherein the layers of the wall comprise an outer layer and an inner layer, and adhesive is positioned between the outer layer and the inner layer to affix the layers.

15. A protective cushion for a vehicle occupant's head according to claim 1, further comprising a constricting element in the cylindrical member downstream from the at least one opening, wherein the constricting element reduces the sectional area of the cylindrical member.

16. A protective cushion for a vehicle occupant's head according to claim 15, wherein the constricting element constricts the passage of the cylindrical member at least until termination of the inflation of the cushion.

17. A protective cushion for a vehicle occupant's head according to claim 15, wherein the constricting element includes stitching.

18. A protective cushion for a vehicle occupant's head according to claim 1, further comprising a plurality of projections commonly extending from the cylindrical member, the occupant-side sheet, and the body-side sheet, and wherein the cylindrical member, the occupant-side sheet, and the body-side sheet are sewn together with a common thread.

19. A protective cushion for a vehicle occupant's head according to claim 18, wherein the common thread is positioned between the cylindrical member and the plurality of projections.

* * * * *